United States Patent [19]

Chan

[11] Patent Number: 4,827,478
[45] Date of Patent: May 2, 1989

[54] DATA INTEGRITY CHECKING WITH FAULT TOLERANCE

[75] Inventor: Wing M. Chan, Fremont, Calif.

[73] Assignee: Tandem Computers Incorporated, Cupertino, Calif.

[21] Appl. No.: 126,812

[22] Filed: Nov. 30, 1987

[51] Int. Cl.⁴ .............................................. G06F 11/10
[52] U.S. Cl. ....................................................... 371/38
[58] Field of Search ......................... 371/38, 37, 39, 40

[56] References Cited

U.S. PATENT DOCUMENTS

| | | | |
|---|---|---|---|
| 4,358,848 | 11/1982 | Patel | 371/39 |
| 4,359,771 | 11/1982 | Johnson et al. | 371/38 |
| 4,371,930 | 2/1983 | Kim | 364/200 |
| 4,493,081 | 1/1985 | Schmidt | 371/38 |
| 4,689,792 | 8/1987 | Traynor | 371/38 |
| 4,763,332 | 8/1988 | Glover | 371/38 |

Primary Examiner—Charles E. Atkinson
Attorney, Agent, or Firm—Townsend and Townsend

[57] ABSTRACT

Fault tolerant apparatus for generating error correcting code and, simultaneous therewith, checking the correctness of the generation, for blocks of data with which the error correcting code is associated and transmitted to a storage medium. The apparatus includes a pair of programmable control devices configured to selectively operate in one of two modes: A first mode in which data being transferred to the storage medium is monitored for generation of an error correcting code to be associated and stored with each data block, and a second mode in which the data being transferred is monitored for detecting errors that may be contained in the data. During data transmission to the storage device, one of the control devices operates in the first mode, while the other control device operates in the second mode to check operation of the first device. When data is retrieved from the storage device, both control devices operate in the second mode to check the correctness of the data being transferred, and the operability of each other.

7 Claims, 2 Drawing Sheets

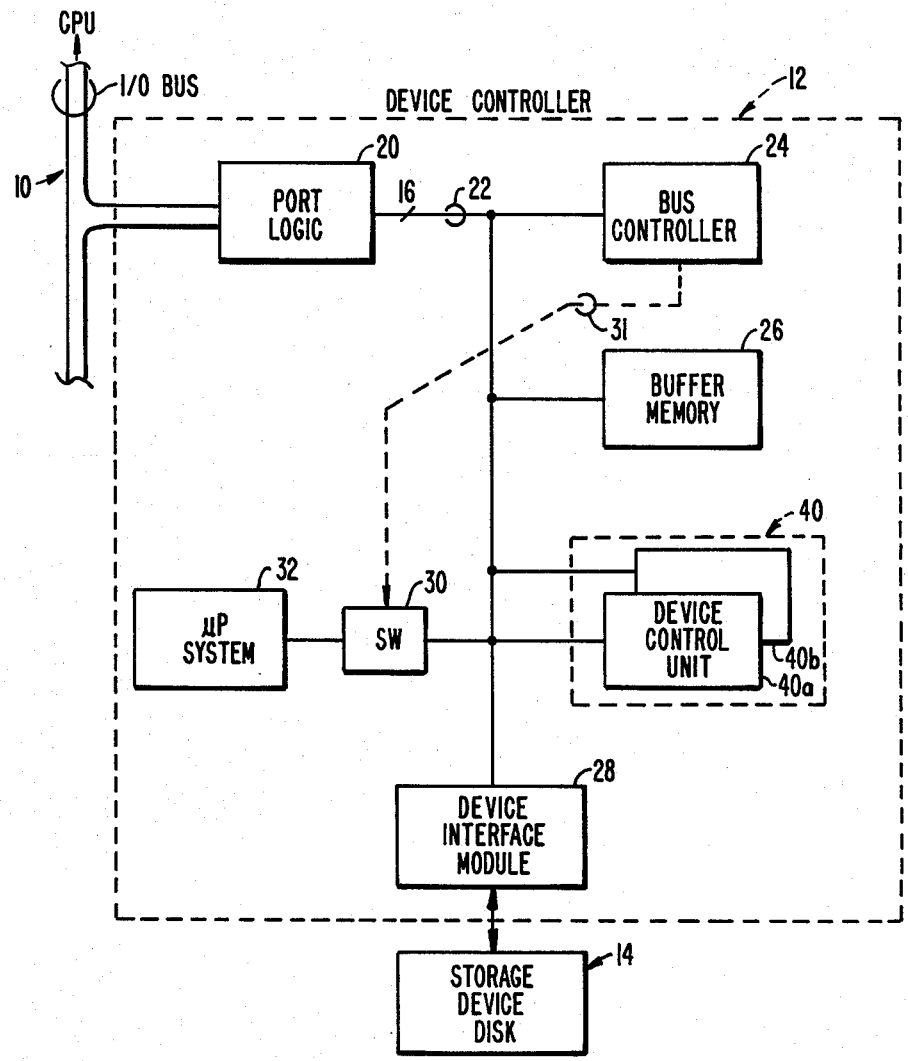
FIG._1.
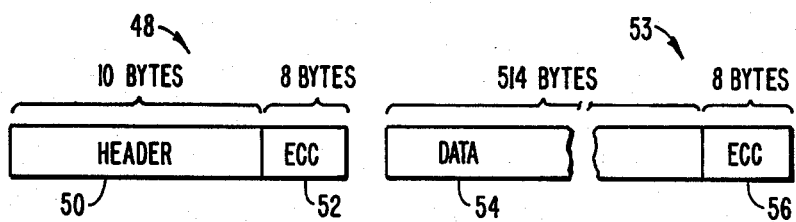
FIG._2.

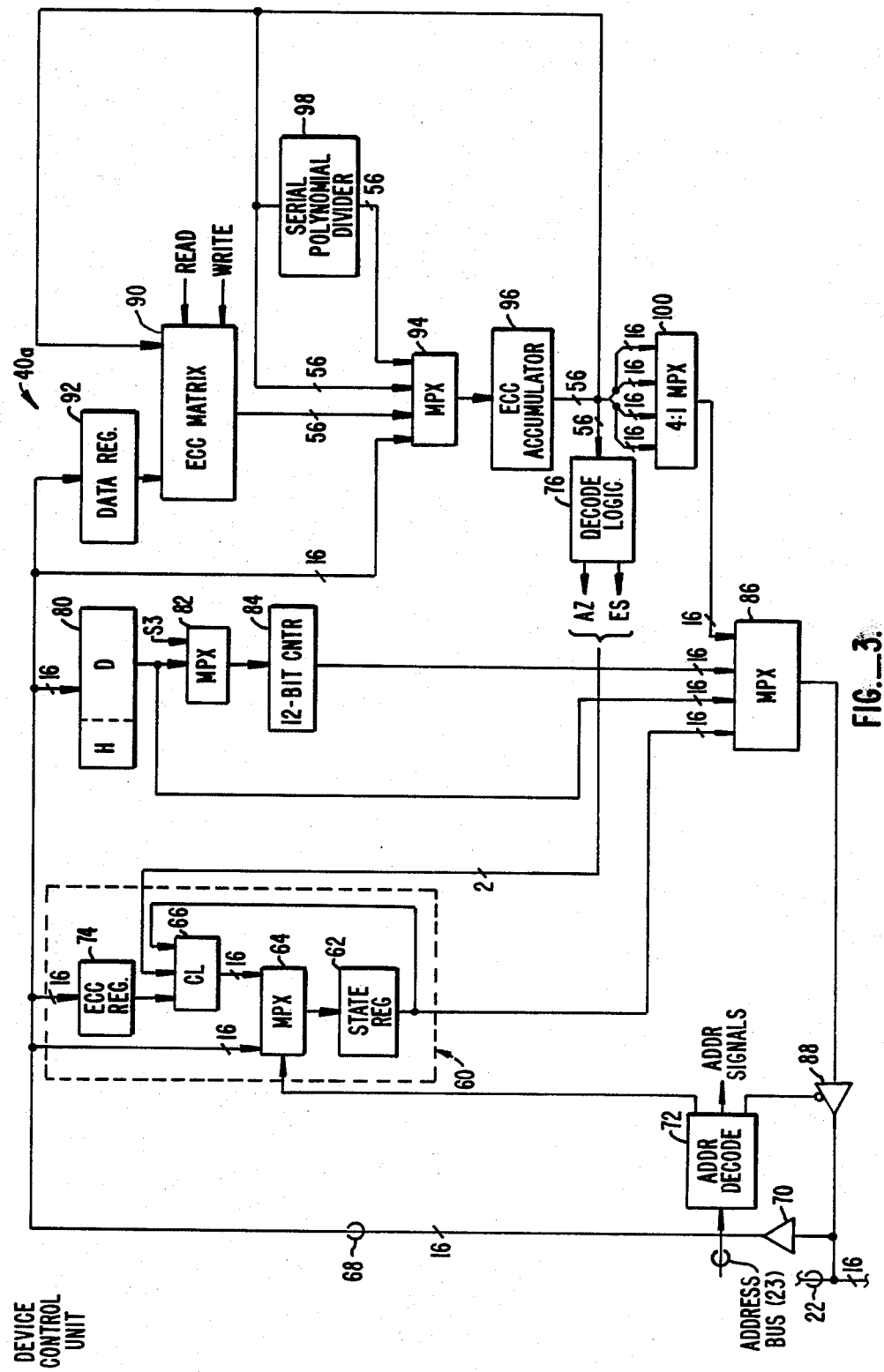
FIG._3.

DATA INTEGRITY CHECKING WITH FAULT TOLERANCE

BACKGROUND OF THE INVENTION

The present invention is directed generally to the transfer of data in a data processing system, and more particularly to a method and apparatus that provides fault tolerant error correcting code generation and detection.

Recognition of the phenomena that if anything can go wrong it will have given rise to error detecting and error correcting codes. Most error detection and correction techniques in use today rely upon one or more forms of "redundancy," extra bits that are an error detection or error correction code and are transmitted along with the informational data. The extra bit or bits can be used to detect errors that may have occurred in the informational bits. Data transmitted in this form, is received and, using the extra bits, checked to determine if the data was corrupted during transmission. If an error occurs, the data can be retransmitted.

Unfortunately, retransmitting the data is not entirely satisfactory. Not only are the additional time and increased complexity of the system (by implementing the necessary two way signalling used to conduct retransmission techniques problems), but if the data is recorded with the error, no amount of retransmission will overcome the problem.

If the redundancy is sufficient, the extra bits can be used to provide error correction to overcome certain of these problems.

In fault tolerant architecture, based upon the philosophy of no single point of failure, the error code generating and checking circuitry is usually duplicated, and operated in "lock step" to provide the fault tolerant capability. Often, one of the circuits are designed solely to perform the error correcting and detecting operations, while the other circuit functions only to check the first. If the first fails, the entire unit fails. If, for one reason or another, both circuits operate incorrectly, the error will never be discovered.

SUMMARY OF THE INVENTION

The present invention provides error code generating and detecting apparatus having a fault tolerant capability beyond that heretofore known, allowing either of the apparatus to perform in the event of failure of the other.

Broadly, the invention comprises a pair of substantially identically structured error code generating and error detecting control apparatus, each operable in one of two modes: A first mode in which data being transferred to a data storage device is monitored to generate therefrom an error correcting code that is associated and stored with the data: and a second mode in which the data being transferred (either to or from the data storage device) is monitored to detect errors in the data.

When data is being transferred to the data storage device, one of the control apparatus operates in the first mode while, simultaneously, the other operates in the second mode to ensure proper operation of the first apparatus.

When receiving data from the data storage device, both control apparatus operate in the second mode.

In addition, both control apparatus are configured to perform the functions of the other. Thus if one fails, the other is still available for error correcting code generation and detection.

A number of advantages are obtained by the present invention, not the least of which is the fault tolerant character of the architecture of the invention.

Another advantage flows from the fact that when data is being transferred to the storage device, one control apparatus operates in the code-generating first mode, while the other operates in the error-detecting second mode to, in effect, check the operation of the first (or itself for that matter). Thus, errors in the first mode of operation will be detected, where they would not if both operated in the first mode.

One area of data processing systems finding extensive use of error-detecting and correcting techniques is in secondary storage. Secondary storage usually is a mass data storing facility in the form of magnetics media accessible to the main computational section of the data processing system by an input/output structure of one type or another. Transferred data can experience corruption anywhere along the route between the computational section and the ultimate secondary storage facility. The invention finds particular advantage in this area.

These and other features and advantages of the present invention will become apparent to those skilled in the art upon a reading of the following detailed description of the invention, which should be taken in conjunction with the accompanying drawings.

BRIEF DESCRIPTION OF THE DRAWINGS

FIG. 1 is an illustrative drawing of a device controller that forms a part of an input/output section of a data processing system to control the transfer of data between a storage device and a processor unit:

FIG. 2 is a diagram, illustrating blocks of information containing data and the error correcting code (ECC) associated with each of the data blocks: and FIG. 3 is a block diagram of the control apparatus used to implement the invention.

DETAILED DESCRIPTION OF THE INVENTION

Referring first to FIG. 1, there is represented an input/output (I/O) section of a data processing system, shown as comprising an I/O bus 10, a device controller 12, and a storage device 14, here represented as a disk unit. Generally, the device controller 12 will operate to control data transferred between a central processing unit (CPU—not shown) and the storage device 14 via the I/O bus 10. Typically, data is communicated on the I/O bus in bit parallel, word series fashion, although other protocols may be used. As is typical for secondary storage, data is transferred to, and received from, the storage device 14 in data word blocks containing a number of informational data words together with error correcting code (ECC) at times referred to herein as the ECC signature.

The particular error correcting code algorithm used is not important to the present invention, although the present invention does use what is known as the "fire code polynomial," providing an 11 bit error correction (i.e., any 11 bit string within the block of informational data words can be corrected, regardless of how many bits in the string are incorrect).

As FIG. 1 further illustrates, the device controller 12 includes port logic 20 to interface the I/O 10 to an internal data bus 22. The internal data bus 22, under control of a bus controller 24, communicates data between the port logic 20 and a buffer memory 26 a device interface module 28, and through a switch connection 30 to a microprocessor system 32.

The bus controller 24 operates to determine the direction that data is being communicated on the internal data bus 22, including the source and destination of that data. The bus controller 24, through the medium (indicate in phantom at 31) of a control connection to the bus switch 30, provides the microprocessor system 32 with access to the internal data bus 22 so that instructions transmitted by the CPU (not shown) can be received and deciphered by the microprocessor system 32, or alternatively so that the microprocessor system 32 can transmit information to the CPU (not shown). For a more complete description of the device controller 12, one is referred to the description of the device controller in application Ser. No. 040,513 (filed Apr. 17, 1987).

Also connected to the internal data bus 22 is a device control module 40, comprising a pair of substantially identically structured device control units 40a, 40b. The device control module 40 performs the error-detecting and error-correcting chores, and implements the present invention in doing so.

Generally, operation of the device controller 12 to transfer data between the CPU (not shown) and the storage device 14 is as follows: Data to be stored by the storage device 14 is communicated via the I/O bus 10 from the CPU (not shown) to the port logic 20, and from there it is communicated, under control of the bus controller 24, by the internal data bus 22 to the buffer memory 26 where it is temporarily stored. Thereafter, the data is accessed from the buffer memory 26 and communicated via the device interface module 28 to be written to the storage device 14 in blocks of data words ("sectors," as known in the art). While the data is being communicated by the internal data bus from the buffer memory 26 to the device control module 28, and on for storing at the storage device 14, it is being monitored by the device control module 40, The device control module 40 operates, using the above-identified burst mode error correcting algorithm (i.e., the fire code algorithm), generates an 8 byte ECC signature (7 bytes of code, 1 byte all ZEROS).

FIG. 2 illustrates the data block formats: for each block of data transferred from the CPU, there is a header block 50 of 10 bytes, identifying the information to follow (in a separate block). Associated with that header block 50, and stored therewith at the storage device 14, is an 8 byte ECC signature of the type described (i.e., 7 bytes of code, 1 byte all ZEROS). The header block 50 and its associated ECC signature 52 is then followed by the data, in the form of a data block 54 (comprising 514 bytes) and an ECC signature 56 associated. The ECC signature 56 is of the same format as the ECC signature 52. Both ECC signatures 52, 56 are generated by one or the other of the device control units 40a, 40b of the device control module 40.

The device control 40a, 40b of the device control module 40 are, as will be seen, state machine controlled, and each is capable of monitoring the data communicated on the internal data bus 22 to generate the ECC signature that will be added to the data bytes to form the header block 48 or data block 53 written to the storage device 14 (in the event of data transfers to the storage device).

When data is being accessed from the storage device 14, it is conducted by the internal data bus 22 to the buffer storage 26, The device control units 40a, 40b again monitors the data being transferred, and creates an error-detection signature that determines the validity of the accessed data. If an error is determined to have occurred in the data, the ECC signature is used to correct hat error.

As will be seen, the device control units 40a, 40b operate simultaneously, but in different modes, during data transfers to the storage device 14 (a "write" operation). The mode of operation of the device controlled units 40a, 40b, is set by the microprocessor system 32, which has read/write access to certain registers contained in each of the device control units 40a, 40b. The microprocessor system 32 can, therefore, write to certain of these registers to start and determine. When started, which mode the particular control unit 40a, 40b will operate. This will be described more fully below.

Turning now to FIG. 3, the device control unit 40a is illustrated in block diagram form. It should be understood that the description of the device control unit 40a will apply equally to the device control unit 40b since the two are substantially identical in all respects.

The heart of the device control unit 40a is a state machine 60, configured to sequentially assume each of a number of predetermined states. Each state assumed functions to dictate operation of the device control unit 40a. The state machine 60, as shown, includes a state register 62, which receives, via a multiplexer (MPX) 64 the 16 bit output of combinatorial logic (CL) 66 or 16 bits of data communicated on the control unit data bus 68. The controlled unit data bus 68 is connected to the internal data bus 22 of the device controller 12 (FIG. 1) via line receiver 70, providing the microprocessor system 32 with access, via MPX 64, to the state register 62. In this manner, the microprocessor system 32 can write to the state register 62 (using address signals communicated on an address bus 23, which are decoded by address decode logic 72 to generate the necessary address and control figures for loading) to start the state machine 60 at any particular state of the succession of states the state machine 60 can assume.

As FIG. 3 further indicates, the combinatorial logic 66 receives the content of an ECC control register, also accessible to the microprocessor system 32. The microprocessor system 32 writes information to the ECC control register 74 that dictates the mode of operation of the state machine 60, and by setting a predetermined bit in the register, enables the state machine 60 for operation.

Finally, the combinatorial logic 60 also receives two bits of information from decode logic 76 that, in turn, receives and tests 56 bits of data to determine if those 56 bits are all zero (AZ) or to test for an end shift (ES) indication.

The control unit data bus 68 is also coupled to a 16 bit storage register 80, having a 5-bit header (H) section and an 11-bit data (D) section. The separate H and D sections of the register 80 are communicated, by an MPX 82 to a 12 bit counter 84. The counter operates to count each word of data communicated on the internal data bus (FIG. 1). The 12 bit counter 84 receives the 5 bits of the H section to count the 10 bytes of the header block 50; it also receives the D section to count the number of data bytes that form the data block 54; and, finally, a constant (S3) is communicated through the MPX 82 to the 12-bit counter 84 for counting the 8 byte ECC signatures 52 and 56 (FIG. 2) that are written to the storage device 14.

The content of the state register 62, the register 80, and the 12 bit counter 84 are readably accessible to the microprocessor system 32 (FIG. 2) for test purposes via a multiplexer MPX 86, and a tri-state line driver 88, that connects the output of the MPX 86 to the internal data bus 22. The line driver 88 is controlled by address signals generated by the microprocessor system 34, as decoded by the address decode 72, to communicate the MPX 86 to the internal data bus 22.

The error correcting code is generated by an ECC matrix 90, a combinatorial logic configuration that implements the correction code algorithm. One input into the ECC matrix 90 is provided by a 16 bit data register 92, that receives each of data words forming the header block 50 and data block 54 (FIG. 2). The ECC matrix also receives READ and WRITE control signal from the ECC control register 74 to direct the configuration of the ECC matrix 90. If information is being transferred (read from) the storage device 14, the ECC register will be set by the microprocessor system 32 to assert the READ signal, configuring the ECC matrix to perform error-detection. As each data word is transferred on the internal data bus 22, it is also routed to and temporarily stored in the data register 92 and used by the ECC matrix 90 to form an error-detection signature.

The ECC matrix produces a 56 bit parallel output that is applied to a multiplexer (MPX) 94 operates to selectively communicate one of several sources of data to an ECC accumulator 96, including the ECC matrix 90, the device control bus 68, the ECC accumulator 96 itself, and a serial polynomial divider 98.

The 56 bit output of the ECC accumulator is applied to the decode logic 76, described above, and to a 4 to 1 multiplexer 100, which breaks the 56 bit output into 16 bit chunks that ultimately find their way to the internal data bus 22 via the MPX 86 and the array of tri-state line drivers 88.

As indicated above, operation of the device control unit 40a, 40b, is directed by the microprocessor system 32 (FIG. 1) and through its access to the ECC control register 74. The ECC control register 74 has bit locations for identifying, for example, the direction of data travel (i.e., whether data is being written to or read from the storage device 14; whether the data being written is header information or data information; and the like).

As mentioned, operation of the device control units 40a, 40b, is initiated by writing a start state to the state register 62, and writing mode information to the ECC register 74, including a START bit that enables the state machine 60 to begin sequencing through its assumable states.

Assume data is to be written to the storage device 14. One of the device control units, 40a say, is initialized by setting it to a state, and providing the ECC control register 74 with information, that causes the device control unit 40a to generate the ECC signature for the transferred date. Thus, as each data word is passed on the internal data bus 22, it is also communicated to loaded in the data register 92 to create the ECC signature.

The device control unit 40b, however, operates differently: At the start of the data transfer (to the storage device 14), the state register 62 is set to a state, and the ECC control register 74 written with information, that places the device control unit 40b in an error-detecting mode (as opposed to the ECC signature-generating mode of device control unit 40a). As with operation of the device control unit 40a, each data word is conducted on the internal data bus 22 from the buffer memory to the device interface module 88 (and on to the storage device 14), it also is loaded in the data register 92. However, whereas in the device control 40a, the ECC control register has a bit set to assert the WRITE signal to the ECC matrix 90 (and de-assert the READ signal) in the device control unit 40a, a bit is set to assert the READ signal (and de-assert the WRITE signal). Accordingly, the ECC matrix 90 of the device control unit 40b, is now configured to check the ECC signature that will be produced by the device control unit 40a. According to the fire code algorithm, when the data (or header) and ECC information have been processed by the device control unit 40b (transmitted by the device control unit 40a) the content of the ECC accumulator 96 will have all ZEROS, a condition which is checked by the decode logic 76 to produce the AZ signal. Should this not be the case, an error condition is evident, and the state machine 60 will produce an error signal signifying the problem.

In summary, there has been disclosed a fault tolerant, data integrity checking method that utilizes a pair of identically structured device control units 40a, 40b. However, rather than operate the units in lock step during data transmissions to a storage device, one is operated in a mode that generates an ECC signature, while the other operates in a different mode to check the signature produced by the first.

In addition, the programmability of the device control units 40a, 40b, allows their functions to be swapped or, in the event of failure of one, to allow the other to operate, to provide the unit with a form of fault tolerance.

I claim:

1. In controller means operable to transfer data to and from a data storage means of the type configured to accessibly retain data in the form of a plurality of data blocks, each of the data blocks having associated therewith an error correcting code, fault tolerant apparatus for creating the error correcting code, the apparatus comprising:

first and second control means each operable in a first mode to monitor the transferred data to generate therefrom and associate with each data block the error correcting code and in a second mode to monitor the transferred data and check the correctness of the error correcting code of each data block transferred between the controller means and the data storage means; and circuit means coupled to the first and second means and operable, when data is transferred to the data storage means, to cause the first means to operate in the first mode and, simultaneously, to cause the second means to operate in the second mode to check operation of the first control means.

2. The apparatus of claim 1, wherein the circuit means includes means for selectively and alternately causing the second means to operate in place of the first means to operate in the first mode and, simultaneously, to cause the first means to operate in place of the second means to operate in the second mode to check operation of the first control means.

3. The apparatus of claim 2, wherein the first and second means are each identically structured state machine means.

4. The apparatus of claim 3, wherein the circuit means include processor means.

5. The apparatus of claim 4, wherein the first and second control means each include register means coupled to receive control data from the processor means to select operation of the first and second state machine means.

6. In controller means operable to transfer data to and from a data storage means of the type configured to accessibly retain data in the form of a plurality of data blocks, each of the data blocks having associated therewith an error correcting code, a method of creating the error correcting code and checking proper operation of said creation, the method comprising the steps of:

providing first and second control means each operable in a first mode to monitor the transferred data to generate therefrom and associate with each data block the error correcting code and in a second mode to monitor the transferred data and check the correctness of the error correcting code of each data block transferred between the controller means and the data storage means; and operating the first control means, when data is transferred to the data storage means, in the first mode; and simultaneous with operation of the first control means, operating the second control means in the second mode to check operation of the first control means.

7. The method of claim 6, including the step of:
operating the first and second control means in the second mode when data is being transferred form the data storage means.

* * * * *